(12) United States Patent
Radrich (10) Patent No.: US 11,318,606 B2
(45) Date of Patent: May 3, 2022

(54) CONTROLLING AN AUTOMATION ASSEMBLY

(71) Applicant: KUKA Deutschland GmbH, Augsburg (DE)

(72) Inventor: Helmuth Radrich, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 614 days.

(21) Appl. No.: 16/085,162

(22) PCT Filed: Mar. 13, 2017

(86) PCT No.: PCT/EP2017/000329
§ 371 (c)(1),
(2) Date: Sep. 14, 2018

(87) PCT Pub. No.: WO2017/157515
PCT Pub. Date: Sep. 21, 2017

(65) Prior Publication Data
US 2019/0077014 A1 Mar. 14, 2019

(30) Foreign Application Priority Data
Mar. 15, 2016 (DE) .......................... 102016003144.1

(51) Int. Cl.
*B25J 9/16* (2006.01)
*G05B 19/42* (2006.01)

(52) U.S. Cl.
CPC ............. *B25J 9/163* (2013.01); *B25J 9/1697* (2013.01); *G05B 19/42* (2013.01); *G05B 2219/36442* (2013.01)

(58) Field of Classification Search
CPC . B25J 9/16; B25J 9/1615; B25J 9/1628; B25J 9/163; B25J 9/1694; B25J 9/1697;
(Continued)

(56) References Cited

U.S. PATENT DOCUMENTS

| | | | |
|---|---|---|---|
| 2011/0106311 A1* | 5/2011 | Nakajima | B25J 9/163 700/253 |
| 2015/0025684 A1* | 1/2015 | Negishi | B25J 9/1664 700/261 |
| 2015/0336268 A1* | 11/2015 | Payton | G05B 19/423 700/261 |

OTHER PUBLICATIONS

Chien-Ming Huang et al., Anticipatory Robot Control for Efficient Human-Robot Collaboration, Mar. 7, 2016, Human Robot Interation, IEEE Press, Piscataway, New Jersey.
(Continued)

*Primary Examiner* — Khoi H Tran
*Assistant Examiner* — Sarah A Tran
(74) *Attorney, Agent, or Firm* — Bachman & LaPointe, P.C.

(57) ABSTRACT

The invention relates to a method for controlling an automation assembly which has a robot assembly with at least one robot (10) and a detection means assembly with at least one detection means (21-23), said method having the following at least partly automated steps: providing (S10) a first sequence of first ordinate data ($q_1$, $q_2$, $dq_2/dt$, $\tau_1$, $\tau_2$) assigned to successive first abscissa points (t) on the basis of first training data ($q_1$, $q_2$, $\tau_1$, $X_2$); identifying (S20) a first event point ($t_E$) within the first abscissa points of the first sequence; and determining (S30) a first event criterion on the basis of the first sequence and the first event point.

20 Claims, 1 Drawing Sheet

(58) Field of Classification Search
CPC ......... B25J 13/00; B25J 13/08; B25J 13/088; B25J 17/00; B25J 17/02; B25J 17/0241; B25J 17/0258; B25J 17/0283; B25J 19/02; B25J 19/021; B25J 19/023; B25J 19/04; G05B 19/00; G05B 19/404; G05B 19/42; G05B 2219/23026; G05B 2219/32184; G05B 2219/36442

See application file for complete search history.

(56) References Cited

OTHER PUBLICATIONS

Daniel Kappler et al., Data-Driven Online Decision Making for Autonomous Manipulation, Jul. 13, 2015, Conference Paper, Robotics: Science and Systems, Rome, Italy.

International Search Report dated Jul. 26, 2017 for PCT Patent Application No. PCT/EP2017/000329.

* cited by examiner

CONTROLLING AN AUTOMATION ASSEMBLY

BACKGROUND

The present invention relates to a method for controlling an automation arrangement having a robot arrangement with at least one robot and a capture means arrangement with at least one capture means, and to a system and a computer program product for carrying out the method and to an arrangement having the automation arrangement and the system.

Robot arrangements having one or more robots, in particular robots (robot arrangements) collaborating with people, are often intended to react to events captured by capture means, in particular during at least partially automated operation in which they execute a program. For example, a robot is intended to terminate an insertion movement if a joining force exerted by it has reached a sufficient limit value which indicates correct joining, or is intended to reorient and/or reposition said movement if a contact force exceeds another limit value indicating an incorrect joining position, for example.

The definition of such events and their parameterization, that is to say, for example, the selection of suitable measurement data and limit values therefor, has previously constituted a large part of the work for generating or modifying programs for automation arrangements having robot and capture means arrangements.

SUMMARY

The object of the present invention is to improve the control of automation arrangements having robot and capture means arrangements.

This object is achieved by means of a method having the features of claim 1. Other claims protect a system and a computer program product for carrying out a method described here and an arrangement having an automation arrangement and a system described here for controlling the automation arrangement. The subclaims relate to advantageous developments.

According to one embodiment of the present invention, a robot arrangement has one or more robots, wherein, in one development, the robot or one or more of the robots (respectively) has/have at least three, in particular at least six, in particular at least seven, joints, in particular rotating joints, and drives for moving or adjusting these joints, in particular in an (electro)motive, hydraulic and/or pneumatic manner.

According to one embodiment of the present invention, a capture means arrangement has one or more capture means, wherein, in one development, the capture means or one or more of the capture means (respectively) capture(s) forces of the robot arrangement and is/are set up for this purpose, in particular using hardware and/or software.

In one embodiment, a force of the robot arrangement (which can be captured, in particular is captured, by the capture means arrangement or one of its capture means) in particular may comprise, in particular may be, a force acting on a robot in the robot arrangement or a force exerted by a robot in the robot arrangement and, in particular, a force in at least one joint of a robot in the robot arrangement. For a more concise description, anti-parallel pairs of forces or torques are likewise referred to as forces in a generalizing manner in the present case.

Additionally or alternatively, in one embodiment, the capture means or one or more of the capture means in the capture means arrangement may (respectively) capture positions and/or time derivatives thereof, in particular speeds, of one or more robots in the robot arrangement and may be set up for this purpose, in particular using hardware and/or software. In one embodiment, a position may comprise, in particular may be, a one-dimensional, two-dimensional or three-dimensional location and/or orientation of a robot-fixed reference, in particular a TCP. Additionally or alternatively, in one embodiment, a position may (respectively) comprise, in particular may be, a position of one or more joints of a robot.

In one embodiment, at least one capture means has one or more sensors, in particular electrical, in particular capacitive and/or inductive, tactile and/or optical sensors, in particular at least one camera and/or at least one force sensor, in particular torque sensor, in particular inside the robot, that is to say, a joint torque sensor in particular, and/or at least one position and/or speed sensor, in particular inside the robot.

According to one embodiment of the present invention, an automation arrangement has the robot arrangement and the capture means arrangement. In one development of the present invention, an arrangement has the automation arrangement and a system for controlling the automation arrangement.

According to one embodiment of the present invention, a method for controlling the automation arrangement has the steps of:

providing (at least) a sequence of ordinate data assigned to successive abscissa points in a completely or partially automated manner on the basis of training data;

identifying (at least) an event point within these abscissa points in this provided sequence in a completely or partially automated manner; and determining (at least) an event criterion in a completely or partially automated manner on the basis of this provided sequence and this identified event point, in which case, without restricting generality, these are referred to in the present case as a first sequence, first abscissa points, first ordinate data, first training data, a first event point and a first event criterion.

In one embodiment, successive abscissa points may in particular comprise, in particular may be, successive times, and ordinate data may accordingly comprise time series, in particular. Additionally or alternatively, in one embodiment, abscissa points may comprise, in particular may be, path (parameter) points or the like. In one embodiment, abscissa points follow one another (at least quasi-) continuously or discretely and/or are assigned to one-dimensional or multidimensional ordinate data (values) in an injective and/or surjective, in particular bijective, manner.

In one embodiment, an event point may be an abscissa point, in particular, or may lie between two successive abscissa points.

In one embodiment, an event criterion defines a one-dimensional or multidimensional condition for ordinate data, in particular one or more upper and/or lower limit values, profiles, statuses or the like, in particular for the occurrence or presence of an event to be detected, or for detecting an event, in particular during operation of the automation arrangement, in particular the robot arrangement, in particular contact with the environment, reaching of a (program) switching point of the like.

The at least partially automated determination of an event criterion on the basis of a sequence of ordinate data and an identified event point within the abscissa points thereof makes it possible, in one embodiment, to improve the definition of events to which the robot arrangement is intended to react during operation and, in particular, to improve the parameterization thereof, that is to say, for example, the selection of suitable measurement data and/or limit values therfor, in particular to simplify and/or perform said definition and parameterization in a quicker, more precise and/or more reliable manner, and/or to optimize the event criterion itself, in particular the selection and/or linking of data and/or limit values therefor.

In one embodiment, the method comprises the steps of:
providing one or more second sequences of second ordinate data (respectively) assigned to successive abscissa points in a completely or partially automated manner on the basis of training data; and
determining the first event criterion in a completely or partially automated manner (also) on the basis of the second sequence(s).

In one embodiment, second ordinate data are assigned to the same (first) abscissa points as the first ordinate data, which simplifies, in particular, the joint handling of the first and second sequence(s). Otherwise, in one embodiment, the first event point and the (second) abscissa points, to which the second ordinate data are assigned, are converted to a common basis, for example the first event point is transformed to the abscissa points or vice versa.

In one embodiment, the second sequence or one or more second sequences of (second) ordinate data is/are provided on the basis of the same training data as the first sequence of ordinate data. For example, training data may comprise, in particular may be, a time series of positions, first ordinate data may comprise, in particular may be, these positions or a subset of these positions, and second ordinate data may comprise, in particular may be, first and/or higher derivatives of these positions with respect to the abscissa points, that is to say in particular the time, a path parameter or the like.

Additionally or alternatively, in one embodiment, the second sequence or one or more second sequences of (second) ordinate data is/are provided on the basis of different training data than the first sequence of first ordinate data.

For example, (first) training data, on the basis of which the first ordinate data are provided, may comprise, in particular may be, a time series of positions, first ordinate data may comprise, in particular may be, these positions, a subset of these positions and/or first and/or higher derivatives of these positions with respect to the abscissa points, that is to say in particular the time, a path parameter or the like, and other (second) training data, on the basis of which second ordinate data in a second sequence are provided, may comprise, in particular may be, a time series of forces, and second ordinate data may comprise, in particular may be, these forces, a subset of these forces and/or first and/or higher derivatives of these forces with respect to the abscissa points, that is to say in particular the time, a path parameter or the like.

Additionally or alternatively, in one embodiment, (first) training data, on the basis of which the first ordinate data are provided, may comprise, in particular may be, a (first) time series of positions during (first) training operation, and first ordinate data may comprise, in particular may be, these positions, a subset of these positions and/or first and/or higher derivatives of these positions with respect to the abscissa points, that is to say in particular the time, a path parameter or the like, and other (second) training data, on the basis of which second ordinate data in a second sequence are provided, may comprise, in particular may be, a (second) time series of the (identical) positions during (second) training operation under changed conditions or a (second) time series which is modified in comparison with the one (first) time series, for example a time series which is noisy by simulation or is systematically changed, wherein the second ordinate data can then similarly comprise, in particular may be, these positions, an (identical) subset of these positions or first and/or higher derivatives of these positions with respect to the abscissa points, that is to say in particular the time, a path parameter or the like.

Determining the first event criterion (also) on the basis of the second sequence(s) makes it possible, in one embodiment, to increase the powerfulness of the set of possible first event criteria and thus to further optimize this event criterion itself, in particular the selection and/or linking of data and/or limit values therefor. Additionally or alternatively, the robustness of the event criterion can be improved in one embodiment by determining the first event criterion (also) on the basis of the second sequence(s).

In one embodiment, the method comprises the steps of:
identifying one or more second event points within the successive first abscissa points in the first sequence in a completely or partially automated manner; and
determining the first event criterion and/or one or more second event criteria in a completely or partially automated manner on the basis of the first sequence and the second event point(s).

Determining the first event criterion (also) on the basis of at least one second event point within the successive first abscissa points in the first sequence makes it possible, in one embodiment, to use repeated occurrence of the same event within the first sequence in order to further improve its definition and, in particular, parameterization, in particular to simplify and/or perform said definition and parameterization in a quicker, more precise and/or more reliable manner, and/or to further optimize the event criterion itself, in particular the selection and/or linking of data and/or limit values therefor.

Determining at least one second event criterion differing from the first event criterion on the basis of the first sequence and the second event point(s) within the successive first abscissa points in the first sequence makes it possible, in one embodiment, to define and, in particular, parameterize different events within the first sequence and therefore, in particular, to increase the powerfulness of the set of possible event criteria.

In one embodiment, the provision of a (first or second) sequence of (first or second) ordinate data assigned to successive (first or second) abscissa points on the basis of (first or second) training data comprises capturing, in particular measuring, these training data in a completely or partially automated manner by means of the capture means arrangement during operation, in particular training operation, of the automation arrangement, in particular the robot arrangement.

In one embodiment, this makes it possible to advantageously determine event criteria on the basis of real (measurement) data and thus to improve their practical applicability.

Additionally or alternatively, in one embodiment, the provision of a (first or second) sequence of (first or second) ordinate data assigned to successive (first or second) abscissa points on the basis of (first or second) training data comprises simulating these training data in a completely or partially automated manner.

As a result, in one embodiment, event criteria can be advantageously based on varied data and their practical applicability can therefore be improved.

In one development, the provision of a first and a second sequence of (first or second) ordinate data assigned to successive abscissa points comprises capturing, in particular measuring, first training data in a completely or partially automated manner by means of the capture means arrangement during operation, in particular training operation, of the automation arrangement, in particular the robot arrangement, providing a first sequence of ordinate data on the basis of these first training data, and capturing, in particular measuring, further (second) training data in a completely or partially automated manner by means of the capture means arrangement during repeated operation, in particular training operation, of the automation arrangement, in particular the robot arrangement, wherein this repeated operation is varied in one development, for example by varying parameters of the automation arrangement, such as kinematic data, mass and the like, and/or boundary conditions, such as environmental stiffness or the like, and providing a second sequence of ordinate data on the basis of these (second) training data.

In addition or as an alternative to capturing different training data during repeated operation, in one embodiment, the provision of a first and a second sequence may comprise capturing, in particular measuring, first training data in a completely or partially automated manner by means of the capture means arrangement during operation, in particular training operation, of the automation arrangement, in particular the robot arrangement, or simulating first training data, providing a first sequence of ordinate data on the basis of the first training data, and systematically and/or stochastically varying the first training data, in particular sampling said training data in different ways, superimposing noise, changing frequencies and/or amplitudes or the like, and providing a second sequence of ordinate data on the basis of these varied training data and/or by systematically and/or stochastically varying the first sequence, in particular superimposing noise, changing frequencies and/or amplitudes or the like.

Additionally or alternatively, in one embodiment, the provision of a first and a second sequence may comprise (first) simulation of first training data in a completely or partially automated manner, providing a first sequence of ordinate data on the basis of the first training data, and (second) simulation of further (second) training data in a completely or partially automated manner and providing a second sequence of ordinate data on the basis of the second training data, wherein this second simulation is varied in one development, for example by varying (model or simulation) parameters of the automation arrangement, such as kinematic data, mass and the like, and/or (model or simulation) boundary conditions such as environment stiffness or the like.

Additionally or alternatively, in one embodiment, the provision of a (first or second) sequence of (first or second) ordinate data assigned to successive (first or second) abscissa points on the basis of (first or second) training data comprises storing, in particular in a memory, loading, in particular from a memory, and/or processing, in particular filtering, amplifying, differentiating one or more times and/or integrating, in particular with respect to or across the abscissa points, that is to say in particular the time, a path parameter or the like, the training data in a completely or partially automated manner, in particular the training data simulated and/or captured by means of the capture means arrangement during operation of the automation arrangement.

As a result of the storing and loading, the training data can be provided off-line in one embodiment. Filtering makes it possible to reduce measurement noise or the like in one embodiment. Additionally or alternatively, filtered training data may constitute advantageous ordinate data in one embodiment. In particular, the filter may comprise, in particular may be, a Gaussian filter, an average, in particular a global or sliding average, a median or the like for this purpose. Measurement data can be advantageously preprocessed by means of amplification in one embodiment. Advantageous ordinate data can be provided and changes in the behavior of the training data can be advantageously detected, in particular, by means of differentiation or integration in one embodiment.

In one embodiment, the identification of a (first or second) event point within the (first or second) abscissa points in a (first or second) sequence comprises capturing a user input, in particular via an interface set up for this purpose, in a completely or partially automated manner, wherein, in one development, the event point is identified in a completely or partially automated manner on the basis of this user input.

As a result, in one embodiment, a user can specify desired events for which a corresponding event criterion is then determined in a completely or partially automated manner on the basis of the ordinate data.

In one development, the user input can be made or captured while capturing the training data by means of the capture means arrangement during operation of the automation arrangement, in particular the robot arrangement. For example, during operation, the user can actuate a knob, a button, a software switch or the like for the event to be defined, and the abscissa point at which the actuation was captured, or an abscissa point dependent thereon, for example an abscissa point advanced by an average response time, can be identified as an event point.

In another development, training data are first of all completely or partially captured by means of the capture means arrangement during operation of the automation arrangement, in particular the robot arrangement, and this operation or a recording thereof, in particular a visual recording, is then repeated at a reduced speed, in particular at a variably reduced speed, in particular at a reduced speed which can be set by the user, and/or with pauses, in particular variable pauses, in particular pauses which can be set by the user, wherein the user input is made or captured during this repetition.

As a result, in one embodiment, the user can precisely specify the event point, in particular even during fast training operation.

Additionally or alternatively, in one embodiment, the identification of a (first or second) event point within the (first or second) abscissa points in a (first or second) sequence comprises capturing an event signal therefor in a completely or partially automated manner by means of the capture means arrangement, in particular while capturing the training data by means of the capture means arrangement during operation of the automation arrangement, in particular the robot arrangement.

If, for example, actuation of a switch by the robot arrangement is intended to be defined as an event, that abscissa point at which the switch outputs an (event) signal can be identified as the event point.

Similarly, the capture means arrangement can capture, for example, contact visually via a camera, via a distance measurement, in particular a laser-based or ultrasound-based distance measurement, or auditorily via a contact noise and can (then) output a corresponding (event) signal, and that abscissa point at which this (event) signal is output can be identified as the contact event point.

In one embodiment, the determination of a (first or second) event criterion on the basis of at least one sequence, in particular the first sequence and/or one or more second sequences, and at least one (first or second) event point comprises varying one or more criteria, in particular one or more limit values, for ordinate data in this sequence in a completely or partially automated manner.

In a simple example, a speed limit value, for instance, can be varied until contact can be precisely detected thereby.

Additionally or alternatively, in one embodiment, the determination of a (first or second) event criterion on the basis of at least one sequence, in particular the first sequence and/or one or more second sequences, and at least one (first or second) event point comprises varying a selection of at least two sequences in a completely or partially automated manner.

In a simple example, it is possible to vary, for instance, between an evaluation of a position, a speed and a force until contact can be precisely detected thereby.

Additionally or alternatively, in one embodiment, the determination of a (first or second) event criterion on the basis of at least one sequence, in particular the first sequence and/or one or more second sequences, and at least one (first or second) event point comprises varying a link, in particular a logical and/or temporal link, of at least one criterion, in particular a limit value, for ordinate data in one sequence and at least one criterion, in particular a limit value, for ordinate data in another sequence in a completely or partially automated manner.

In a simple example, it is possible to vary, for instance, between a link of a position and a speed limit value, a position and a force limit value and a speed and force limit value until contact can be precisely detected thereby.

An event criterion can generally be determined, in particular, using so-called "complex event detection" or "complex event processing" ("CEP") methods which are known per se, wherein determination of an event criterion comprises, in particular is, the stipulation of said event criterion, in particular the selection or generation, and/or the parameterization of said event criterion in one embodiment.

In one embodiment, a user can influence the variation of the criterion, the selection and/or the link, in particular can prioritize, block or exclude or the like certain criteria, selections and/or links.

In particular, in one embodiment, one or more sequences which are advantageous for detecting an event can first of all be determined on the basis of training data for a specific application, for example acceleration and/or force time series suitable for detecting actuation of a switch. If an event of the same type should then be detected in another application, for example the actuation of another switch with a more rigid characteristic curve or the like, the user can specify these determined advantageous sequences or can restrict the variation of the selection to these sequences, with the result that only the other acceleration or force threshold value which is advantageous for the other application then has to be determined.

In particular, in this respect, variation described here comprises in one embodiment capturing a user specification for this in a completely or partially automated manner, wherein the criterion, the selection and/or link is/are varied on the basis of this user specification.

In one embodiment, the event criterion or at least one event criterion, preferably all event criteria, which is/are determined, has/have real-time capability, in particular its/their real-time capability can be taken into account in a completely or partially automated manner when varying the criterion, the selection and/or link.

In a simple example, training data are differentiated with respect to (further) ordinate data or sequences only until this (numerical) differentiation can still be carried out in real time during operation of the automation arrangement, in particular the robot arrangement.

In one embodiment, the event criterion or criteria is/are used, in particular in a completely or partially automated manner, when generating and/or modifying or to generate and/or modify a program for controlling the automation arrangement, in particular the robot arrangement.

In a simple example, a user can use a limit value in a robot control program, which limit value has been determined, as described here, in an automated manner on the basis of a sequence and an event point.

As a result, the generation and/or modification of programs can be improved, in particular simplified and/or carried out in a quicker, more precise and/or more reliable manner.

In one embodiment, the automation arrangement, in particular the robot arrangement, is controlled on the basis of such a (robot (control)) program. Accordingly, in one embodiment, the method comprises the steps of:

capturing current data in a completely or partially automated manner by means of the capture means arrangement during operation of the automation arrangement, in particular the robot arrangement; and controlling the automation arrangement, in particular the robot arrangement, in a completely or partially automated manner on the basis of the current data and one or more event criteria which have been determined as described here, in particular triggering at least one action of the automation arrangement, in particular the robot arrangement, as a result of at least one event criterion being satisfied by the current data.

According to one embodiment of the present invention, a system is set up to carry out a method described here and/or has:

means for providing a first sequence of first ordinate data assigned to successive first abscissa points in an at least partially automated manner on the basis of first training data;

means for identifying a first event point within the first abscissa points in the first sequence in an at least partially automated manner; and means for determining a first event criterion in an at least partially automated manner on the basis of the first sequence and the first event point.

In one embodiment, the system has:

means for providing at least one second sequence of second ordinate data assigned to successive abscissa points in an at least partially automated manner on the basis of training data; and means for determining the first event criterion in an at least partially automated manner on the basis of the second sequence.

In one embodiment, the system has:

means for identifying at least one second event point within the successive first abscissa points in the first sequence in an at least partially automated manner; and means for determining the first and/or at least one second event criterion in an at least partially automated manner on the basis of the first sequence and the second event point.

In one embodiment, the system has:
means for capturing the training data in an at least partially automated manner by means of the capture means arrangement during operation of the automation arrangement, in particular the robot arrangement; and/or
means for simulating the training data in an at least partially automated manner; and/or
means for storing, loading and/or processing, in particular filtering, amplifying, differentiating one or more times and/or integrating, the training data in an at least partially automated manner, in particular the simulated training data and/or training data captured by means of the capture means arrangement during operation of the automation arrangement;
for the purpose of providing a sequence of ordinate data assigned to successive abscissa points on the basis of training data.

In one embodiment, the system has: means for capturing a user input and/or an event signal in an at least partially automated manner by means of the capture means arrangement, in particular while capturing the training data by means of the capture means arrangement during operation of the automation arrangement, in particular the robot arrangement, for the purpose of identifying an event point within the abscissa points in a sequence.

In one embodiment, the system has:
means for capturing the training data in an at least partially automated manner by means of the capture means arrangement during operation of the automation arrangement, in particular the robot arrangement;
means for repeating this operation or a recording thereof in an at least partially automated manner at a reduced speed, in particular at a variably reduced speed, and/or with pauses, in particular variable pauses; and
means for capturing the user input in an at least partially automated manner during this repetition.

In one embodiment, the system has: means for varying at least one criterion, in particular a limit value, for ordinate data in a sequence in an at least partially automated manner for the purpose of determining an event criterion on the basis of this sequence and at least one event point.

In one embodiment, the system has: means for varying a selection of at least two sequences and/or a link, in particular a logical and/or temporal link, of at least one criterion, in particular a limit value, for ordinate data in one sequence and at least one criterion, in particular a limit value, for ordinate data in another sequence in an at least partially automated manner for the purpose of determining an event criterion on the basis of at least one sequence and at least one event point.

In one embodiment, the system has: means for capturing a user specification for the variation in an at least partially automated manner.

In one embodiment, the system has:
means for capturing current data in an at least partially automated manner by means of the capture means arrangement during operation of the automation arrangement, in particular the robot arrangement; and
means for controlling the automation arrangement, in particular the robot arrangement, in an at least partially automated manner on the basis of the current data and at least one event criterion, in particular triggering at least one action of the automation arrangement, in particular the robot arrangement, as a result of at least one event criterion being satisfied by the current data.

In one embodiment, the system has: means for generating and/or modifying a program for controlling the automation arrangement, in particular the robot arrangement, in an at least partially automated manner using at least one event criterion.

In one embodiment, the system has: means for capturing forces of the robot arrangement, in particular in joints of at least one robot in the robot arrangement, in an at least partially automated manner by means of at least one capture means in the capture means arrangement.

A means in the sense of the present invention can be designed using hardware and/or software, in particular can have a processing unit, in particular a digital processing unit, in particular a microprocessor unit (CPU), which is preferably connected to a memory and/or bus system using data or signals, and/or one or more programs or program modules. The CPU can be designed to execute instructions implemented as a program stored in a memory system, to capture input signals from a data bus and/or to output output signals to a data bus. A memory system may have one or more storage media, in particular different storage media, in particular optical, magnetic, solid-state and/or other non-volatile media. The program can be such that it embodies or is able to carry out the methods described here, with the result that the CPU can carry out the steps of such methods.

In one embodiment, one or more steps, in particular all steps, of the method are carried out in a completely or partially automated manner, in particular by the system or its means. In the present case, "(at least) partially automated" is understood as meaning, in particular, computer-assisted and "completely automated" is accordingly understood as meaning, in particular, completely carried out by a computer.

BRIEF DESCRIPTION OF THE DRAWINGS

Further advantages and features emerge from the subclaims and the exemplary embodiments. In this respect, in a partially schematic manner:

DETAILED DESCRIPTION

Figure 1:
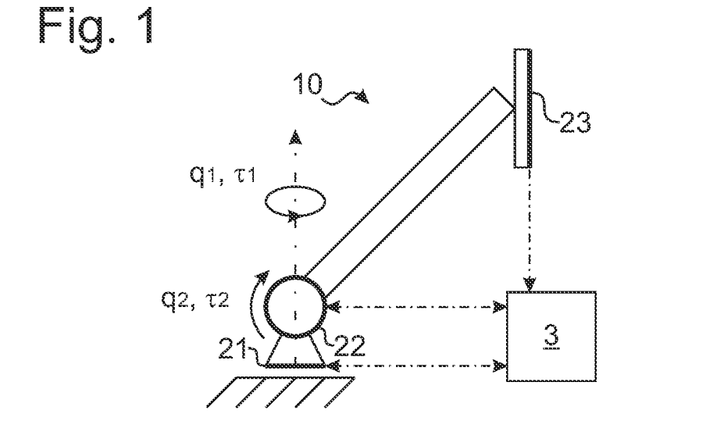
FIG. 1 shows an arrangement having an automation arrangement, which has a robot arrangement with a robot and a capture means arrangement with capture means, and having a system for controlling the automation arrangement according to one embodiment of the present invention.

FIG. 1 shows an arrangement having an automation arrangement, which has a robot arrangement with a robot 10 and a capture means arrangement with capture means 21-23, and having a system 3 for controlling the automation arrangement according to one embodiment of the present invention.

For a better overview, in the exemplary embodiment which is accordingly highly simplified, the robot 10 has only a first rotating joint, which can be adjusted with respect to the environment by the rotation angle $q_1$ about a vertical axis, and an arm which can be adjusted with respect to the first rotating joint by the rotation angle $q_2$ about a horizontal axis. Position and torque sensors 21, 22 in these joints provide the system 3 with corresponding position data $q_1$, $q_2$ and force or torque data $\tau_1$, $\tau_2$.

In addition, in the exemplary embodiment, for better understanding, the capture means arrangement has a force sensor or pressure switch 23 which provides the system 3 with an event signal when actuated.

FIG. 2 indicates, again in a highly simplified manner, the position data $q_1$, the first time derivative $dq_2/dt$ of the position data $q_2$ and the force or torque data $\tau_1, \tau_2$ against the time t when the robot 10 actuates the force sensor or pressure switch 23 by pivoting down its arm. It is seen that this event is not reflected in the data $q_1$, $\tau_1$ relating to the first joint, whereas the speed $dq_2/dt$ decreases greatly and the torque $\tau_2$ increases to a greater extent than before in the second joint.

Figure 3:
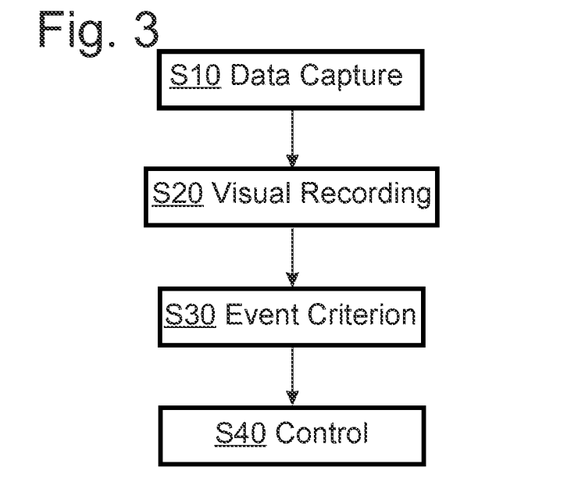
FIG. 3 shows a method for controlling the automation arrangement according to one embodiment of the present invention.

FIG. 3 shows a method for controlling the automation arrangement according to one embodiment of the present invention, which method is carried out by the system 3. In this respect, reference is made to the fact that the system 3 may also have a two-part design, in particular, and, according to one embodiment of the present invention, may have a part (subsystem) for determining at least one event criterion and generating and/or modifying a program for controlling the automation arrangement, in particular the robot arrangement, using this event criterion and a further part (subsystem) which is, in particular, separate therefrom and is intended to execute the program or control the automation arrangement, in particular the robot arrangement.

In a step S10, the force sensor or pressure switch 23 is actuated during training operation by pivoting down the robot arm and position data $q_1$, $q_2$ and force or torque data $\tau_1$, $\tau_2$ are captured in the process by the sensors 21, 22 as training data.

On the basis of these training data, the system 3 provides, in step S10, ordinate data in the form of time series $q_1(t)$, $q_2(t)$, $\tau_1(t)$, $\tau_2(t)$ by means of filtering and/or amplification and provides further ordinate data in the form of further time series $dq_1/dt$, $dq_2/dt$ by means of differentiation.

Figure 2:
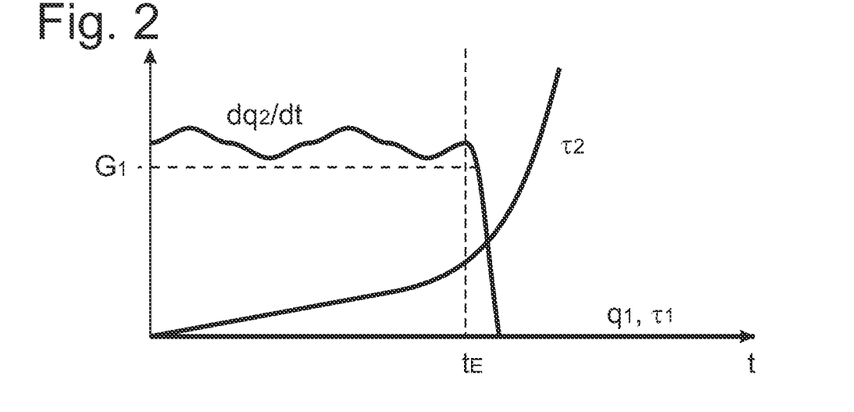
FIG. 2 shows various sequences of provided ordinate data.

In a step S20, a visual recording of this actuation is repeated at a reduced speed which is set by the user, with the result that a user can precisely determine the moment at which contact is made with the switch when viewing the visual recording, for example by means of a voice command, a key press or the like, and can input this moment as an event (time) point $t_E$, as indicated in FIG. 2. Equally, an event signal from the force sensor or pressure switch 23 can also be used, for example, to identify the event (time) point $t_E$ in a completely automated manner.

In a step S30, the system 3 now varies a selection of the available ordinate data $q_1(t)$, $q_2(t)$, $\tau_1(t)$, $\tau_2(t)$, $dq_1/dt$, $dq_2/dt$, different threshold values for these ordinate data, for example $dq_2/dt<G_1$, $dq_2/dt<G_2$ etc., as well as different links of these threshold values, for example $dq_2/dt<G_1$ AND $\tau_2>G_3$ etc., and determines that event criterion which best detects the event (time) point $t_E$.

In the exemplary embodiment (which is highly simplified for illustration), the ordinate data $q_1(t)$, $\tau_1(t)$ and $dq_1/dt$, for example, do not have any correlation with the event (time) point $t_E$, the ordinate data $\tau_2(t)$ have a medium correlation and the ordinate data $dq_2/dt$ have a large correlation, wherein the undershooting of a threshold value $G_1$ best detects the event (time) point $t_E$. It should be emphasized that this exemplary embodiment is highly simplified for better understanding and contact could be detected in an (even) better manner, for example, on the basis of an absolute value of an acceleration limit value being exceeded, but no ordinate data $|d^2q_2/dt^2|$ are taken into account in the exemplary embodiment for better clarity.

Accordingly, in step S30, the system 3 determines that the threshold value $G_1$ is undershot by the speed $dq_2/dt$ in the second rotating joint as the event criterion for detecting actuation of the force sensor or pressure switch 23 by the robot 10.

This event criterion is then used in a step S40 in a program for the robot 10 and the robot is controlled on the basis of this program.

If a program for actuating a more rigid switch is intended to be created, the same method can be carried out again in principle.

In this case, the user can already restrict the available ordinate data to the ordinate data $dq_2/dt$ in step S30 since it is known from the previous application that these ordinate data are particularly suitable for detecting actuation of a switch. The system then determines only the new threshold value suitable for the more rigid switch in step S30.

It also becomes clear from the exemplary embodiment (which is highly simplified for illustration) that, in step S10, further training data could also be provided, for example by measuring or simulating actuation of more rigid switches, and that event criterion which is overall most suitable for these different training data could be determined in step S30, with the result that a particularly robust event criterion can be advantageously determined.

It also becomes clear that the user in FIG. 2 could also input further event points for detecting further events, for instance a collision of the robot 10 rotating about the vertical axis, or for detecting the same event if repeated actuation of the pressure sensor or switch 23 is measured.

Although exemplary embodiments have been explained in the description above, it should be pointed out that a multiplicity of modifications are possible. In addition, it should be pointed out that the exemplary embodiments are only examples which are not intended to restrict the scope of protection, the applications and the structure in any manner. Rather, the description above provides a person skilled in the art with a guideline for implementing at least one exemplary embodiment, in which case various changes can be made, in particular with regard to the function and arrangement of the components described, without departing from the scope of protection which emerges from the claims and these equivalent combinations of features.

LIST OF REFERENCE SIGNS

10 Robot
21-23 Sensor (capture means)
3 System
The invention claimed is:
1. A method for controlling an automation arrangement having a robot arrangement with at least one robot (10) and a capture means arrangement with at least one capture means (21-23), having the at least partially automated steps of:
providing (S10) a first sequence of first ordinate data ($q_1$, $q_2$, $dq_2/dt$, $\tau_1$, $\tau_2$) assigned to successive first abscissa points (t) on the basis of first training data ($q_1$, $q_2$, $\tau_1$, $\tau_2$);
identifying (S20) a first event point ($t_E$) within the first abscissa points in the first sequence; and
determining (S30) a first event criterion on the basis of the first sequence and the first event point, characterized in that:
that the provision of the first sequence of ordinate data assigned to successive first abscissa points on the basis of training data comprises capturing the first training data in an at least partially automated manner by means of the capture means arrangement during operation of the robot arrangement, and/or simulating the first training data in an at least partially automated manner and/or storing, loading and/or filtering, amplifying, differentiating one or more times and/or integrating, the training data simulated and/or captured using the capture means arrangement during operation of the automation arrangement;

at least one capture means in the capture means arrangement captures positions of and/or forces and/or torques in joints of at least one robot in the robot arrangement, in an at least partially automated manner;

at least one additional capture means in the capture means arrangement additionally captures the first event and outputs a corresponding event signal and an abscissa point at which this event signal is output is identified as the first event point; and the determination of the first event criterion on the basis of the first sequence and the first event point comprises, in an at least partially automated manner, varying a selection of a logical and/or temporal link between:
  a limit value criterion for ordinate data in one said sequence; and
  a limit value criterion for ordinate data in another said sequence.

2. The method as claimed in claim 1, having the at least partially automated steps of:
  providing (S10) at least one second sequence of second ordinate data $(q_1, q_2, dq_2/dt, \tau_1, \tau_2)$ assigned to successive abscissa points (t) on the basis of training data $(q_i, q_2, \tau_1. \tau_2)$; and
  determining (S30) the first event criterion on the basis of the second sequence.

3. The method as claimed in claim 1, having the at least partially automated steps of:
  identifying (S20) at least one second event point within the successive first abscissa points in the first sequence; and
  determining (S30) the first and/or at least one second event criterion on the basis of the first sequence and the second event point.

4. The method as claimed in claim 1, characterized in that: the at least one capture means in the capture means arrangement captures said forces and/or torques in said joints of said at least one robot in the robot arrangement, in said at least partially automated manner.

5. The method as claimed in claim 1, characterized in that: the at least one additional capture means captures said first event visually or auditorily.

6. The method as claimed in claim 1, having the at least partially automated steps of:
  capturing (S10) the training data by means of the capture means arrangement during operation of the automation arrangement, in particular the robot arrangement;
  repeating (S20) this operation or a recording of it at a variably reduced speed, and/or with variable pauses; and
  capturing (S20) the user input during this repetition.

7. The method as claimed in claim 1, characterized in that the determination of an event criterion on the basis of at least one sequence and at least one event point comprises varying a limit value for ordinate data in this sequence in an at least partially automated manner.

8. The method as claimed in claim 1, characterized in that the variation comprises capturing a user specification in an at least partially automated manner.

9. The method as claimed in claim 1, characterized in that at least one event criterion has real-time capability.

10. The method as claimed in claim 1, having the at least partially automated steps of:
  capturing (S40) current data by means of the capture means arrangement during operation of the robot arrangement; and
  controlling (S40) the robot arrangement on the basis of the current data and at least one event criterion, the controlling triggering at least one action of the robot arrangement as a result of at least one event criterion being satisfied by the current data.

11. The method as claimed in claim 1, comprising an at least partially automated generating and/or modifying (S40) a program for controlling the robot arrangement, using at least one event criterion.

12. The method as claimed in claim 1, characterized in that:
  the first event is a contact; and
  the at least one additional capture means captures said contact via a laser-based or ultrasound-based distance measurement.

13. A system which is set up to cavy out a method as claimed in claim 1, and has:
  means (3) for providing a first sequence of first ordinate data $(q_1, q_2, dq_2/dt, \tau_1, \tau_2)$ assigned to successive first abscissa points (t) on the basis of first training data $(q_1, q_2, \tau_1, \tau_2)$;
  means (3) for identifying a first event point $(t_E)$ within the first abscissa points in the first sequence; and
  means (3) for determining a first event criterion on the basis of the first sequence and the first event point.

14. An arrangement having an automation arrangement, which has a robot arrangement with at least one robot (10) and a capture means arrangement with at least one capture means (21-23), and having a system as claimed in claim 13, for controlling the automation arrangement.

15. A computer program product having a program code which is stored on a computer-readable medium and is intended to carry out a method as claimed in claim 1.

16. A method for controlling an automation arrangement having a robot arrangement with at least one robot (10) and a capture means arrangement with at least one capture means (21-23), having the at least partially automated steps of:
  providing (S10) a first sequence of first ordinate data $(q_1, q_2, dq_2/dt, \tau_1, \tau_2)$ assigned to successive first abscissa points (t) on the basis of first training data $(q_1, q_2, \tau_1, \tau_2)$;
  identifying (S20) a first event point $(t_E)$ within the first abscissa points in the first sequence; and
  determining (S30) a first event criterion on the basis of the first sequence and the first event point, characterized in that:
  the determination of an event criterion on the basis of at least one sequence and at least one event point comprises, in an at least partially automated manner, varying a selection of at least two sequences of a limit value criterion for ordinate data.

17. The method as claimed in claim 16, having the at least partially automated steps of:
  providing (S10) at least one second sequence of second ordinate data $(q_1, q_2, dq_2/dt, \tau_1, \tau_2)$ assigned to successive abscissa points (t) on the basis of training data $(q_1, q_2, \tau_1, \tau_2)$; and
  determining (S30) the first event criterion on the basis of the second sequence.

18. The method as claimed in claim 17, having the at least partially automated steps of:

identifying (S20) at least one second event point within the successive first abscissa points in the first sequence; and determining (S30) the first and/or at least one second event criterion on the basis of the first sequence and the second event point.

19. A method for controlling an automation arrangement having a robot arrangement with at least one robot (10) and a capture means arrangement with at least one capture means (21-23), having the at least partially automated steps of:

providing (S10) a first sequence of first ordinate data ($q_1$, $q_2$, $dq_2/dt$, $\tau_1$, $\tau_2$) assigned to successive first abscissa points (t) on the basis of first training data ($q_1$, $q_2$, $\tau_1$, $\tau_2$);

identifying (S20) a first event point ($t_E$) within the first abscissa points in the first sequence;

determining (S30) a first event criterion on the basis of the first sequence and the first event point;

capturing (S40) current data by means of the capture means arrangement during operation of the robot arrangement; and controlling (S40) the robot arrangement on the basis of the current data and at least one event criterion, the controlling triggering at least one action of the robot arrangement as a result of at least one event criterion being satisfied by the current data, characterized in that:

at least one capture means in the capture means arrangement captures positions of and/or forces and/or torques in joints of at least one robot in the robot arrangement, in an at least partially automated manner;

at least one additional capture means in the capture means arrangement additionally captures the first event and outputs a corresponding event signal and an abscissa point at which this event signal is output is identified as the first event point; and the determination of an event criterion on the basis of the first sequence and the first event point comprises, in an at least partially automated manner, varying a selection of a logical and/or temporal link between:

a limit value criterion for ordinate data in one said sequence; and a limit value criterion for ordinate data in another said sequence.

20. The method as claimed in claim 19, wherein:

the first event is a contact;

the at least one capture means in the capture means arrangement captures said forces and/or torques in said joints of said at least one robot in the robot arrangement, in said at least partially automated manner; and the at least one additional capture means captures said contact auditorily.

* * * * *